Figure 1A:
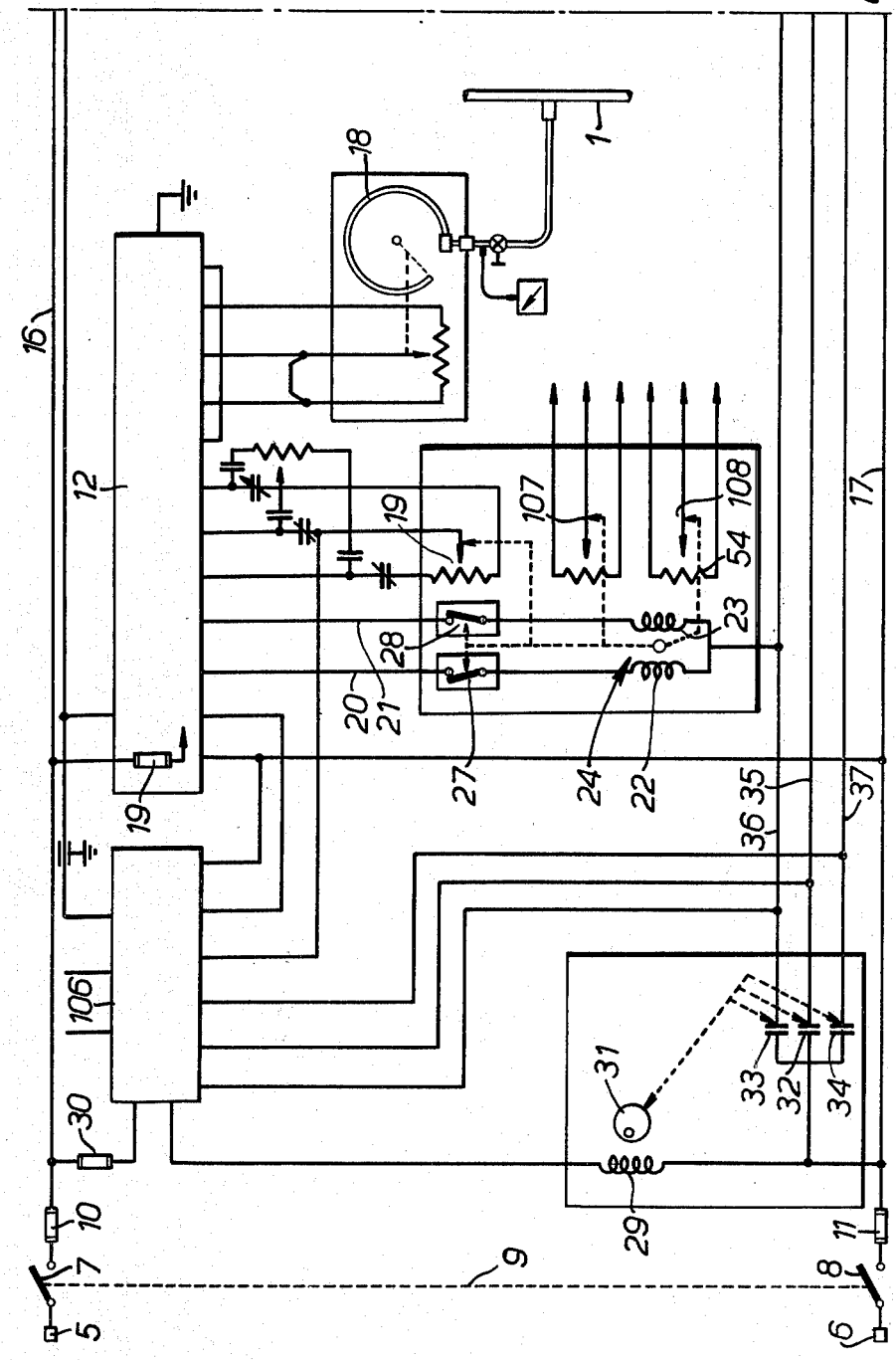

United States Patent [19]

Hodgson

[11] 4,003,342
[45] Jan. 18, 1977

[54] AUTOMATIC CONTROL SYSTEM
[75] Inventor: Stanley Cyril Hodgson, London, England
[73] Assignee: Tank Sapp (UK) Ltd., London, England
[22] Filed: Mar. 27, 1975
[21] Appl. No.: 562,990
[30] Foreign Application Priority Data
    Mar. 29, 1974 United Kingdom ............ 14091/74
[52] U.S. Cl. .......................... 122/448 R; 236/14
[51] Int. Cl.² .................................... F23N 3/00
[58] Field of Search ............ 220/88 B; 122/448 R, 122/448 S; 236/14

[56] References Cited
UNITED STATES PATENTS

| | | | |
|---|---|---|---|
| 2,870,729 | 1/1959 | Shannon et al. | 236/14 |
| 2,895,056 | 7/1959 | Bristol | 236/14 |
| 3,284,615 | 11/1966 | Yetter | 236/14 |
| 3,285,711 | 11/1966 | Stanford | 220/88 B |
| 3,300,133 | 1/1967 | Dines | 236/14 |
| 3,415,232 | 12/1968 | Garrett, Jr. et al. | 122/448 |
| 3,616,997 | 11/1971 | Oldenburg | 236/14 |
| 3,899,099 | 8/1975 | Oiestad | 220/88 B |

Primary Examiner—Kenneth W. Sprague
Attorney, Agent, or Firm—Amster & Rothstein

[57] ABSTRACT

This invention is an automatic control system, for example, for controlling the burner in a boiler in accordance with changes in the desired or actual steam demand and the invention is an improvement on the subject of British Patent Specification No. 1084671 which was for one system for automatically adjusting the air and fuel supplies in accordance with changes in the measured steam pressure or the demanded steam pressure.

13 Claims, 3 Drawing Figures

AUTOMATIC CONTROL SYSTEM

The present invention is a control system enabling a slight change in steam pressure to produce accurate control of both fuel and air supplies independently of each other so as to increase or decrease the output of the boiler while yet keeping the relationship between the air and fuel supplies appropriate for efficient combustion. That is achieved by adjusting set values of the fuel and air supplies through individual ON/OFF step cycles, the lengths of the ON/OFF steps of which may be the same or different depending on the circumstances. The adjustments may be through cams or the equivalent enabling a particular characteristic law to be followed.

This invention relates to an automatic control system for controlling a first variable quantity which depends on second and third variable quantities. One example is a system for controlling a boiler output, possibly the steam pressure representing the first variable quantity which in turn depends on the rate of supply of fuel and of air representing the second and third quantities. In that application the steam pressure can be varied by varying the rate of supply of fuel but unless the rate of supply of air is also controlled to maintain a predetermined relationship to the rate of supply of fuel — probably a non-linear relationship-combustion will not be efficient and there will be either oxygen or unburnt fuel in the exhaust gases. Where, as in one application of the present invention to a marine oil tanker, the exhaust gases are used to fill space in tanks not completely filled with oil in order to reduce the likelihood of a fire, it is very important that the content of the exhaust gases can be carefully controlled.

However although the invention is particularly applicable to such a system, it is equally applicable to other automatic control systems for controlling different quantities.

According to the present invention a control system includes a comparator for comparing a measure of the first quantity with a set value, controls for each of the second and third quantities for adjusting them to accord with respective set values, and individual setting means for modifying the set values of the second and third quantities in accordance with any difference between the measured and set values of the first quantity.

Preferably the individual setting means are driven by a timer motor in intermittent ON/OFF steps because that is a very convenient way of reducing the likelihood of the system hunting and also enables the set values of the second and third quantities to be adjusted at different rates merely by changing the relative size of the ON/OFF periods for resetting all the respective set values.

Where a small change in the first variable quantity is arranged to produce full control of the set values of the second and third quantities, the system may be made very stable by arranging that adjustment of the set values of the second and third quantities also adjusts the set value of the first quantity. The system will then 'search' for convenient settings of all three quantities when a balance is ahceived.

The relationship between the durations of the ON/-OFF steps for the second and third quantities when the set values are being adjusted up and down respectively may be different; so for example in the case described above when the boiler is having its fuel supply increased, the rate of supply of air can increase faster than the rate of increase of fuel, whereas that is not normally required when the boiler is being turned down.

Conveniently for each of the variables there is an electrical bridge for comparing the set value with the measured value of the quantity.

In order that the set values of the second and third quantities can be adjusted in a predetermined relationship to each other, means for adjusting them may include individual cams which can be calculated or shaped by trial and error to give a particular law.

Figure 1B:
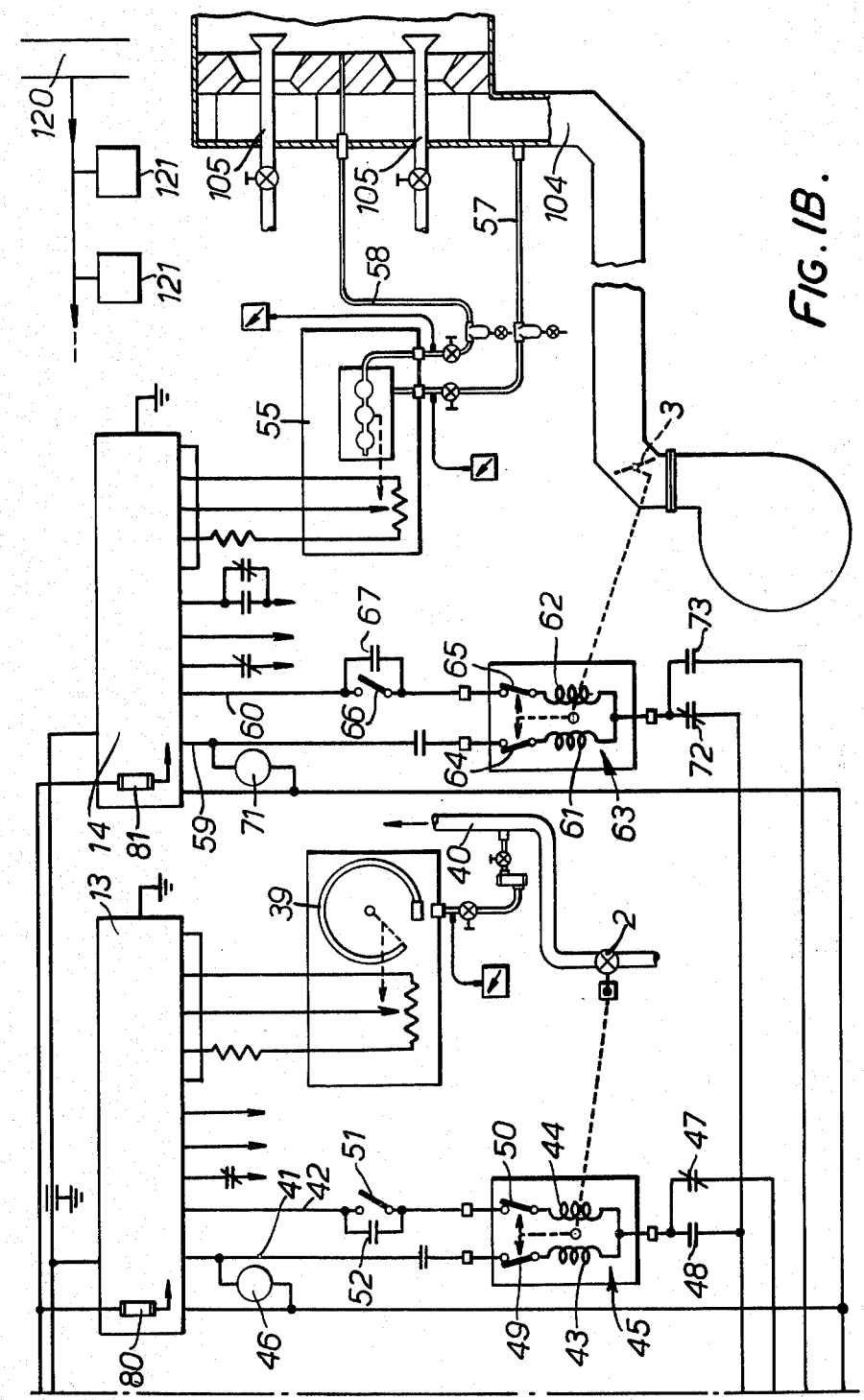
Figure 2:
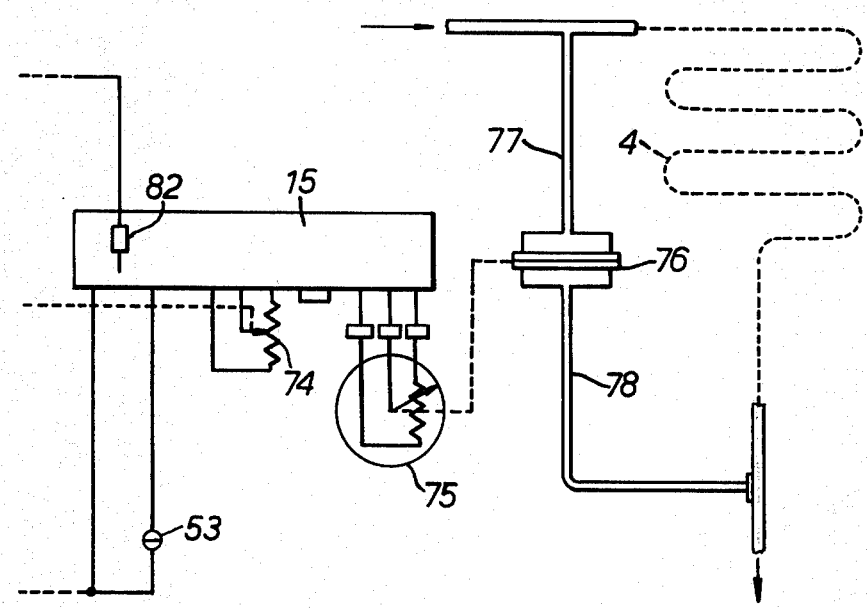

In order that the invention may be clearly understood and readily carried into effect, a preferred embodiment thereof will now be described, by way of example only, with reference to the accompanying drawings, in which:

FIG. 1 (A and B) shows a circuit diagram of part of a control system according to the invention used to control combustion in a marine oil-fired furnace and its associated boiler; and FIG. 2 shows the remainder of the control system of FIG. 1 and its connection to the superheater of the furnace.

Referring to the drawings, the control system senses the pressure of steam in a steam pipe 1, and if this differs from a predetermined desired value (for example if the pressure drops below the normal running steam pressure by reason of the steam demand being increased), acts to adjust a fuel valve 2 to alter the pressure and hence the rate of supply of fuel to the burner or burners (not shown) of the furnace to restore the steam pressure to the desired value. At the same time the system acts to adjust the position of a damper 3 in the air supply line feeding the windbox 104 of the furnace and so controls the supply of air to the burner or burners 105.

The control system of FIGS. 1 and 2 is connected to a suitable a.c. power supply (not shown) via live and neutral terminals 5 and 6 respectively, poles 7 and 8 of a double pole switch 9 and fuses 10 and 11. The system includes an "electrical dial set" 12 and two "electronic positioners" 13, and 14 connected between live and neutral lines 16 and 17 respectively. The dial set 12 and the positioners 13, and 14 are all standard commercially available pieces of equipment.

The circuitry of dial set 12 is used to monitor the steam pressure in the steam pipe 1 by means of a pressure transducer 18. A potentiometer 19 for setting a desired steam pressure is connected to dial set 12 which includes the remaining elements of an a.c. bridge circuit and a phase error detector. The transducer 18 and the potentiometer 19 form two arms of the a.c. bridge and the phase error detector detects when the bridge becomes unbalanced and in which sense. If the steam pressure in pipe 1 as measured at 18 does not correspond with the pressure set at 19, the resulting signal from the phase error detector activates one or other of two lines 20 and 21, each of which is connected to a respective one of the windings 22 and 23 of a reversible a.c. motor 24. Also connected in series with a respective winding 22 or 23 are limit switches 27 and 28 which are set to the "high fire" and "low fire" conditions of the boiler. As indicated by a broken line the armature of motor 24 is mechanically linked to the rider of the potentiometer 19 in such a way that movement of the armature of the motor 24 tends to adjust the rider of potentiometer 19 in a direction to bring the bridge circuit of dial set 12 back into balance. Winding 22 corresponds to the "decrease" direction of motor 24 and winding 23 to the "increase" direction thereof.

A further motor whose winding is indicated at 29 is connected in series with a pulse unit error detector 106 between the live line 16 and the neutral line 17 and is protected by a suitable fuse 30. The detector 106 is coupled to the positioners 12, 13 and 14, and is arranged only to energise the motor 29 when one of the positioners indicates that an adjustment is to be made to re-balance its bridge. When the signal concerned goes through zero, the motor 29 is also de-energised, and that tends to reduce the likelihood of pivoting. The motor 29 drives a series of cams 31 which act for a purpose which will be explained hereafter upon three sets of contacts 32, 33 and 34 which are also connected to the neutral terminal 6 via the fuse 11. The cams 31 are so designed that the different pairs of contacts 32, 33 and 34 are open and shut for different periods of time. Thus, for example, the contacts 32 may be arranged to be open for 1 second and closed for 1 second during each revolution of the cams 31, whereas the contacts 33 are opened for half a second and closed for 1½ seconds during each revolution of the cam 31 and the contacts 34 are closed for half a second and open for 1½ seconds during each such revolution. Contacts 32, 33 and 34 are connected to respective neutral lines 35, 36 and 37 and thus electrical pulses of differing durations are generated in the three lines 35, 36 and 37 for a purpose which will be explained hereafter. In line 35 the pulses thus follow a 1 second "on" 1 second "off" sequence; in line 36 the sequence is 1½ seconds on and half a second off and in line 37 it is half a second on and 1½ seconds off.

As can be seen from FIG. 1 the windings 22 and 23 of the motor 24 are connected to the line 36 and thus, if the cams 31 are set as described above, the motor 24 will run for 1½ seconds and then stop for ½ a second in the appropriate direction when either of the lines 20 or 21 is activated under the action of the phase error detector of dial set 12. This will produce a corresponding stepwise movement of the rider of the potentiometer 19.

The armature of motor 24 is also mechanically linked to the rider of a further potentiometer 38; potentiometer 38 forms one arm of a further a.c. bridge circuit, a further arm of which is formed by a pressure transducer 39 which is used to detect the pressure in the oil feed pipeline 40 downstream of the fuel valve 2. The pressure in the pipe 40, which leads to the burner or burners of the furnace (not shown), as already mentioned determines the rate of supply of oil to the burner or burners. Electronic positioner 13 includes the remaining elements of this further a.c. bridge circuit and a phase error detector. The phase error detector of electronic positioner 13 is arranged to detect imbalance of its a.c. bridge circuit and the sense thereof, and when the bridge circuit is out of balance, activated one or other of lines 41 and 42 which are connected in series with a respective winding 43 and 44 of a further reversible a.c. motor 45 which is mechanically linked to the fuel control valve 2. Thus motor 45 acts to adjust valve 2 until the pressure in pipe 40 changes to a value sufficient to change the resistance of the transducer 39 to re-balance the bridge circuit of positioner 13 in dependence on the position of the rider of potentiometer 39. Winding 43 corresponds to the decrease direction of motor 45 whilst winding 44 drives motor 45 in the increase direction thereof.

A relay 46 is connected between neutral line 17 and line 41. On activation of line 41 relay 46 is also activated and opens normally closed contacts 47 and closes normally open contacts 48. Whilst line 42 is activated the windings of motor 45 are thus connected to line 35 but, when line 41 is activated, relay 46 causes the windings 43 and 44 to be connected to line 36. Limit switches 49 and 50 are connected in series with the respective windings 43 and 44 of motor 45 to prevent excess rotation thereof.

Electronic positioner 14 also contains elements of an a.c. bridge circuit, two of the arms of which are constituted by a potentiometer 54 and a differential pressure transducer 55. Transducer 55 monitors the pressure differential that exists across a diaphragm between the windbox and the interior of the furnace. Thus pipe 57 is connected to the air inlet supply to the wind box whilst pipe 58 leads to the interior of the furnace. The magnitude of this pressure differential determines the rate of supply of air to the burner or burners, given a fixed air inlet area of cross-section to the burner or burners supplied by the windbox. As with the electronic dial set 12 and the electronic positioner 13 the phase error detector of the electronic positioner 14 serves to detect any imbalance between the potentiometer 54 and the transducer 55 and the sense of such imbalance. When the bridge circuit of positioner 14 is out of balance, its phase error detector activates one of two lines 59 and 60 each of which is connected to a respective winding 61 or 62 of a further reversible motor 63 which is mechanically linked to the damper 3. Limit switches 64 and 65 are connected in series with a respective winding 61 or 62 to prevent excess rotation of the moter 63.

A relay 71 is connected between lines 59 and 17 so that when line 59 is activated normally closed contacts 72 open and normally open contacts 73 close; this has the effect of changing the neutral connection of the windings 61 and 62 of the motor 57 from the line 36 to the line 37.

The motor 24 drives the riders of the potentiometers 38 and 54 through respective cams 107 and 108 because for most efficient combustion, it is necessary that the fuel valve 2 and damper 3 are operated at different rates for different settings. Thus the cam 107 has an approximately linear relationship between motor movement and valve movement, whereas cam 18 gives an approximately square base relationship. The actual cam slopes are adjusted by a fitter by trial and error when setting up the system.

In normal operation of the boiler, assuming that a steady steam pressure of the desired value is being maintained in steam pipe 1 and valve 2 and damper 3 are set appropriately to maintain such desired value, then any increase in demand for steam, as for example upon extra power being required for the ship's engines, will cause a drop in the steam pressure which will unbalance the bridge of electronic dial set 12. The phase error detector will then activate the appropriate line, i.e. the line 21, to activate the winding 23 of the motor 24 to drive its armature in the increase direction. Because the windings 22 and 23 of the motor 24 are connected to the neutral line 36 which is connected to the neutral terminal 6 via the contacts 33, the motor 24 will be driven intermittently in the sequence 1½ seconds on and ½ second off. The armature of the motor 24 will thus move stepwise correspondingly. Since the armature of the motor 24 also drives the riders of potentiometers 19, 38 and 54, these also will move up stepwise in the sequence 1½ seconds on and ½ second off. Each stepwise increase in, for example, the resistance of the potentiometer 38 will cause the bridge circuit of positioner 13 to become unbalanced because the pressure transducer 39 will no longer be in balance with the potentiometer 38 and the corresponding phase error detector will activate line 42 and the winding 44 of the motor 45 corresponding to the increase direction. The armature of the motor 45 will thus open valve 2 further and permit more fuel to enter fuel line 40 and the pressure therein to rise, thus tending to adjust the resistance of transducer 39 to bring the bridge circuit of positioner 13 back into balance. However, the windings of motor 45 are connected normally to neutral line 35 which is connected to the neutral contact 6 through the contacts 32. As the armature of motor 45 moves in the increase direction it also moves stepwise but according to the sequence 1 second on and 1 second off.

Movement of the rider of potentiometer 54 driven by the armature of motor 24 will throw the bridge circuit of positioner 14 out of balance and the phase error detector will activate line 60 and winding 62 of the motor 63 corresponding to the increase direction. The armature of motor 63 will thus open the damper 3 further to increase the air pressure in the wind box. Since the winding 62 is connected to the neutral line 36 the armature of motor 63 also moves stepwise corresponding to the sequence 1½ seconds on and ½ second off.

Motor 24 will continue to operate until potentiometer 19 and transducer 18 are again in balance. Motors 45 and 63 will continue to operate to open valve 2 and damper 3 to bring transducer 39 into balance with the thus set value of potentiometer 38 and to bring transducer 55 into balance with the setting of potentiometer 54 determined by the motor 24.

It will thus be seen that during the increase phase the rate of supply of air to the burner or burners is increasing faster than the rate of supply of oil. This helps suppress smoke generation.

Upon the demand for steam being reduced, as for example a reduction in the power demand on the ship's engines, the pressure in steam pipe 1 will rise, again throwing the bridge circuit of electronic dial set 12 out of balance. This time the phase error detector will activate line 20 causing motor 24 to be driven in the decrease direction. The bridge circuits of electronic positioner 13 and 14 will likewise be thrown out of balance because the motor 24 will have changed the resistances of potentiometer 38 and 54. This will cause activation of lines 41 and 59 which will cause motors 45 and 63 to drive in the decrease direction thus shutting valve 2 and damper 3 respectively. Activation of line 41 operates relay 46 causing contacts 47 to open and contacts 48 to close. In the decrease direction of movement of motor 45, its winding 43 is thus connected to neutral line 36 subjecting it to the 1½ second on and ½ second off pulsing sequence. Thus in the decrease direction motors 24, and 45 both follow the 1½ second on and ½ second off pulsing sequence.

Similarly, also the action of the relay 71 opens contacts 72 and closes contacts 73 to switch the pulsing movement of motor 63 to the ½ second on and 1½ second off pulsing sequence.

In a specific embodiment the motor 24 is of a type which rotates at a rate corresponding to one revolution every 1.8 – 2 minutes; the transducers 18 and 39 are 500 ohm pressure transducers operative over a range of 0 to 300 p.s.i. whilst the differential pressure transducer 55 is a 500 ohm pressure transducer operative over a range 0 – 10 ins water gauge. Each of the potentiometers 19, 54 and 74 is a 135 ohm potentiometer in this embodiment. Motor 29 is set to rotate at 30 r.p.m.

Although the illustrated apparatus has been described incorporating the impulse timer generating pulses in the neutral lines 35, 36 and 37 having pulsing sequences corresponding to 1 second on and 1 second off, 1½ seconds on and ½ off, and ½ second on and 1½ seconds off respectively, other pulsing sequences may be used as appropriate for a particular boiler.

Furthermore it is to be understood that, although the illustrated control system has been described in relation to the control of combustion in an oil-fired marine boiler, it can be used in any form of oil or gas-fired boiler, such as a power station or any industrial boiler.

However, although fire control of the air/fuel ratio is useful with any boiler, it has a particular advantage with a boiler for driving a marine oil tanker, where there is a danger of fire if partly filled oil tanks contain atmospheric air. The exhaust 120 from the boiler can be supplied to the tanks 121 to prevent the entry of air, and if that exhaust is low in oxygen content, the danger of fire will be slight. However, it is necessary to control the air/fuel ratio of the boiler closely at all settings if the low oxygen content is to be maintained, and the control system just described is emminently suitable for that.

By use of electronic amplification in the positioner 12, the system described can produce full control movement of the motor 24 for a charge in steam pressure of 1%, thereby giving a very sensitive system.

If the boiler has a superheater, it is essential that the firing rate is retained at a low level until there is an adequate flow of steam through the superheater. This protection can be provided by measuring the flow of steam through the superheater using a differential pressure transducer the resultant signal according to steam flow either:

a. retaining on start up of burners, the fuel and air levels at approximately 30% of maximum, or b. when the steam flow is adequate, releasing the controller to operate directly from the steam pressure transducer.

The superheater is indicated at 4 in FIG. 2 and an electronic positioner 15 is connected to a potentiometer 74 which forms one arm of an a.c. bridge circuit, another arm of which is formed by a differential pressure transducer 75 which detects the pressure difference across a diaphragm 76 between the stream pressure in a pipe 77 and that in the pipe 78 and hence detects the pressure differential existing across the superheater 4. Potentiometer 74 is also mechanically linked as indicated by the broken lines to motor 24, and the positioner 15 is supplied from 16 and 17.

A relay 53 is connected to electronic positioner 15 and remains unoperated when there is an insufficient pressure differential across the superheater 4 as monitored by the differential pressure transducer 76. However when the pressure differential across superheater 4 is sufficiently high for safe operation the relay 53 is activated by the phase error detector of positioner 15 to cause normally open contacts 52 and 67 (see FIG. 1) to close.

Each of the contacts 52 and 67 is connected across a limit switch 51 or 66 included in series with the limit switches 50 and 65 and set to lower limits of fuel value and air damper openings than the switches 50 and 65.

Thus, when there is insufficient pressure and the relay 53 is unoperated, the switches 51 and 66 are effective to de-energise the motor windings 45 and 62 at a low firing rate. In this way the burner output is limited to a predetermined low value (say 30% of maximum) whilst the steam pressure builds up. Only when sufficient steam pressure has built up and steam is passing through superheater 4 at an adequate rate as monitored by the pressure differential between the pipes 77 and 78 can the bridge of electronic positioner 15 come sufficiently into balance to allow relay 53 to operate and close its associated contact 52 and 67. The cut-out switches 51 and 66 then do not open-circuit the windings 44 and 62 and the valve 2 and damper 3 can open beyond their predetermined low values.

The electronic dial set 12 and each of the electronic positioners 13, 14 and 15 are individually protected by fuses 79, 80 and 81 respectively.

What we claim as our invention and desire to secure by Letters Patent is:

1. An automatic control system for controlling a first variable quantity which depends on second and third variable quantities, including means for setting a set value of the first quantity, means for measuring the actual value of the first quantity, a comparator for comparing the actual value of the first quantity with the set value, means for setting a set value of the second quantity, means for measuring the actual value of the second quantity, means for setting a set value of the third quantity, means for measuring the actual value of the third quantity, individual controls for each of the second and third quantities for adjusting them to accord with the respective differences between their actual values and their set values, and a control responsive to a difference between the set and actual value of the first quantity for modifying the set values of the second and third quantities, which responsive control includes a timer motor, and respective on/off switch means between the timer motor and each of the setting means for the second and third quantities.

2. A control system as claimed in claim 1 in which the timer motor includes drive means for adjusting a set value of the first quantity.

3. A control system as claimed in claim 1 in which the set values of the second and third quantities are adjusted with steps of different ON/OFF duration.

4. A control system as claimed in claim 2 in which the set value of the first quantity is adjusted in ON/OFF steps of different duration from those in which either of the set values of the second and third values are adjusted.

5. A control system as claimed in claim 1 in which the timer motor is only energised when one of the three quantities does not agree with its set value.

6. A control system as claimed in claim 1 in which the relationship between the durations of the ON/OFF steps for the second and third quantities when the set values are being adjusted up and down respectively are different.

7. A control system as claimed in claim 1 in which the ON/OFF steps are determined by cam operated switches driven by cams on the timer motor shaft.

8. A control system as claimed in claim 1 in which a small change in the first variable quantity can produce full control of the adjustment of the respective set values.

9. A control system as claimed in claim 1 including an electrical bridge comprising the said comparator and electrical bridges respectively for comparing each of the measured values of the second and third quantities with their respective set values.

10. A control system as claimed in claim 1 in which the individual setting means for the second and third quantities include cams ensuring that the relationship between movement of the timer motor and modification of each set value accords with a predetermined relationship.

11. A control system as claimed in claim 1 in which said first quantity is defined as the output of a boiler, and the second and third quantities are defined as the fuel rate and the air flow rate of the boiler.

12. A control system as claimed in claim 1 in which said first quantity is defined as the output of a boiler providing marine propulsion of an oil tanker, and exhaust gas from the boiler is supplied to partly filled oil tanks in the tanker.

13. A control system as claimed in claim 11 in which a superheater is provided, and means restricts the fuel rate and the air flow rate to the boiler if the pressre across the superheater is less than a predetermined fraction of full load pressure.

* * * * *